(12) United States Patent
Harpur et al.

(10) Patent No.: US 10,693,730 B2
(45) Date of Patent: *Jun. 23, 2020

(54) COMMUNICATION QUALITY MANAGEMENT

(71) Applicant: International Business Machines Corporation, Armonk, NY (US)

(72) Inventors: Liam S. Harpur, Dublin (IE); Jonathan Dunne, Dungarvan (IE); Kelley Anders, East New Market, MD (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/196,486

(22) Filed: Nov. 20, 2018

(65) Prior Publication Data

US 2020/0162331 A1     May 21, 2020

(51) Int. Cl.
*H04W 24/00* (2009.01)
*H04W 72/00* (2009.01)
(Continued)

(52) U.S. Cl.
CPC ........ *H04L 41/0896* (2013.01); *G06F 16/909* (2019.01); *G06K 9/00778* (2013.01);
(Continued)

(58) Field of Classification Search
CPC ......... H04W 4/02; H04W 4/24; H04W 16/12; H04W 24/00; H04W 28/08; H04W 48/04;
(Continued)

(56) References Cited

U.S. PATENT DOCUMENTS

| | | |
|---|---|---|
| 7,899,019 B1 | 3/2011 | Evans et al. |
| 9,402,188 B2 | 7/2016 | Sofman et al. |

(Continued)

FOREIGN PATENT DOCUMENTS

| | | |
|---|---|---|
| CN | 107333143 A | 11/2017 |
| CN | 107635236 A | 1/2018 |
| WO | 2017176248 A1 | 10/2017 |

OTHER PUBLICATIONS

Satake, "Precise and Fast Interactive Area QoE Management Framework Toward 5G Era" IEEE 2016, 17th International Telecommunications Network Strategy and Planning Symposium, Sep. 2016, 6 pages. https://ieeexplore.ieee.org/document/7751182/.

Wang et al., "Research on wireless coverage area detection technology for 5G mobile communication networks", International Journal of Distributed Sensor Networks, 2017, vol. 13(12), Research Article, accepted: Nov. 3, 2017, 11 pages. http://journals.sagepub.com/doi/abs/10.1177/1550147717746352.

(Continued)

*Primary Examiner* — Matthew W Genack
(74) *Attorney, Agent, or Firm* — Daniel C. Housley

(57) ABSTRACT

Techniques for managing the quality of a communication service may include obtaining crowd movement information relating to movement of individuals in a crowd within geographical spaces, and obtaining user activity information relating to one or more activities of interest to a user in a geographical space. A bandwidth density model is generated, based on the obtained crowd movement information and user activity information, the bandwidth model describing a variation of communication bandwidth density in the geographical space with respect to location and time. Quality of communication service parameters are determined, based on the bandwidth density model, with respect to location for the geographical space. Based on the quality of communication service parameters and a current location of the user in the geographical space, a target location in the geographical space is determined for the user. The user is instructed to move to the target location in the geographical space.

20 Claims, 9 Drawing Sheets

(51) Int. Cl.
| | |
|---|---|
| *H04L 12/24* | (2006.01) |
| *H04W 4/021* | (2018.01) |
| *G06K 9/00* | (2006.01) |
| *G06F 16/909* | (2019.01) |
| *H04L 29/08* | (2006.01) |
| *H04W 28/20* | (2009.01) |

(52) U.S. Cl.
CPC .......... *G06K 9/00885* (2013.01); *H04L 67/22* (2013.01); *H04L 67/306* (2013.01); *H04L 67/36* (2013.01); *H04W 4/021* (2013.01); *H04W 28/20* (2013.01)

(58) Field of Classification Search
CPC .. H04W 64/00; H04W 72/04; H04M 2215/32
USPC .......... 455/405–408, 450–451, 452.1–452.2, 455/453, 456.1–456.6, 457
See application file for complete search history.

(56) References Cited

U.S. PATENT DOCUMENTS

| | | | |
|---|---|---|---|
| 9,594,538 | B2 | 3/2017 | Jouin |
| 10,356,552 | B1 | 7/2019 | Anders et al. |
| 2007/0081469 | A1 | 4/2007 | Tracy et al. |
| 2010/0110195 | A1* | 5/2010 | Mcintosh ........... H04N 7/17309 348/157 |
| 2011/0148610 | A1* | 6/2011 | Snider ..................... B60R 25/00 340/426.22 |
| 2011/0307538 | A1* | 12/2011 | Rimac ............... H04L 29/08846 709/202 |
| 2013/0078925 | A1 | 3/2013 | Aguirre et al. |
| 2014/0372348 | A1* | 12/2014 | Lehmann ............. G06K 9/6265 706/12 |
| 2015/0036494 | A1 | 2/2015 | Kotecha et al. |
| 2015/0043390 | A1 | 2/2015 | Wang et al. |
| 2015/0262456 | A1* | 9/2015 | Shore ................. G07F 17/3288 463/25 |
| 2016/0021578 | A1 | 1/2016 | Bostick et al. |
| 2016/0183047 | A1 | 6/2016 | Jouin |
| 2017/0041750 | A1* | 2/2017 | Jose ..................... G01S 5/0205 |
| 2017/0150365 | A1 | 5/2017 | Goswami et al. |
| 2017/0176202 | A1 | 6/2017 | Anderson et al. |
| 2017/0265104 | A1 | 9/2017 | Arslan et al. |
| 2017/0286036 | A1 | 10/2017 | Wong |
| 2017/0372593 | A1* | 12/2017 | Chadwick ............. G08B 27/00 |
| 2018/0004362 | A1 | 1/2018 | Harrison |
| 2018/0352386 | A1 | 12/2018 | Gunasekara et al. |
| 2018/0367421 | A1* | 12/2018 | Cloonan ............. H04L 41/5067 |
| 2018/0374000 | A1* | 12/2018 | Herzig ................... G06N 3/006 |
| 2019/0068333 | A1* | 2/2019 | Luo ..................... H04L 1/1812 |

OTHER PUBLICATIONS

Andriyanto et al., "The QoE Assessment Model for 5G Mobile Technology" 2017 IEEE, Research Article, 5 pages. http://journals.sagepub.com/doi/abs/10.1177/1550147717746352.

Wang et al., "A Data-Driven Architecture for Personalized QoE Management in 5G Wireless Networks", Accepted from Open Call, IEEE Wireless Communications, 9 pages, Feb. 2017. https://ieeexplore.ieee.org/document/8272574/.

Biral et al., "The challenges of M2M massive access in wireless cellular networks", Science Direct, Digital Communications and Networks (2015), Available online Mar. 27, 2015, 19 pages. http://www.sciencedirect.com/science/article/pii/S235286481500005X.

Bangerter et al., "Networks and Devices for the 5G Era", 5G Wireless Communication Systems: Prospects and Challenges, 7 pages, Feb. 2014. http://tarjomefa.com/wp-content/uploads/2016/09/5296-English.pdf.

Goicochea, "Building Smart Cities through Location-based Technology", MOCA Blog, Dec. 2, 2016, 8 pages. http://blog.mocaplatform.com/building-smart-cities-through-proximity-beacon-and-geolocation-technology/#.WUwyYhPys6g.

Miah et al., "Super allocation and Cluster-Based Cooperative Spectrum Sensing in 5G Cognitive Radio Network", Published by INTECH, 2016, Chapter 9, 23 pages. https://cdn.intechopen.com/pdfs-wm/52937.pdf.

"5G—Challenges", Tutorials Point, printed Sep. 27, 2018, 3 pages, Copyright © tutorialspoint.com. https://www.tutorialspoint.com/5g/5g_challenges.htm.

Cranz, "The Future of Super-Fast 5G Internet Is a Mess", GIZMODO, Mar. 1, 2017, 4 pages. http://gizmodo.com/the-future-of-super-fast-5g-internet-is-a-mess-1792648410.

Best, "The race to 5G: Inside the fight for the future of mobile as we know it", TechRepublic, Dec. 15, 2014, 16 pages. http://www.techrepublic.com/article/does-the-world-really-need-5g/.

Oreskovic, "Google tests waters for potential ultra-fast wireless service", Reuters, Technology News, Oct. 15, 2014, 6 pages. http://www.reuters.com/article/us-google-wireless-idUSKCN0I42TN20141015.

Anh, "Algorithms and Optimization for Quality of Experience Aware Routing in Wireless Networks: From Centralized Solutions", Theses, Université Rennes, Jan. 27, 2017, 185 pages.

List of IBM Patents or Patent Applications Treated as Related, dated Jan. 20, 2020, 2 pages.

Anders et al., "Determining Hardware Requirements for a Wireless Network Event Using Crowdsourcing", U.S. Appl. No. 16/418,413, filed May 21, 2019.

Anders et al., "Determining Hardware Requirements for a Wireless Network Event Using Crowdsourcing", U.S. Appl. No. 16/693,942, filed Nov. 25, 2019.

* cited by examiner

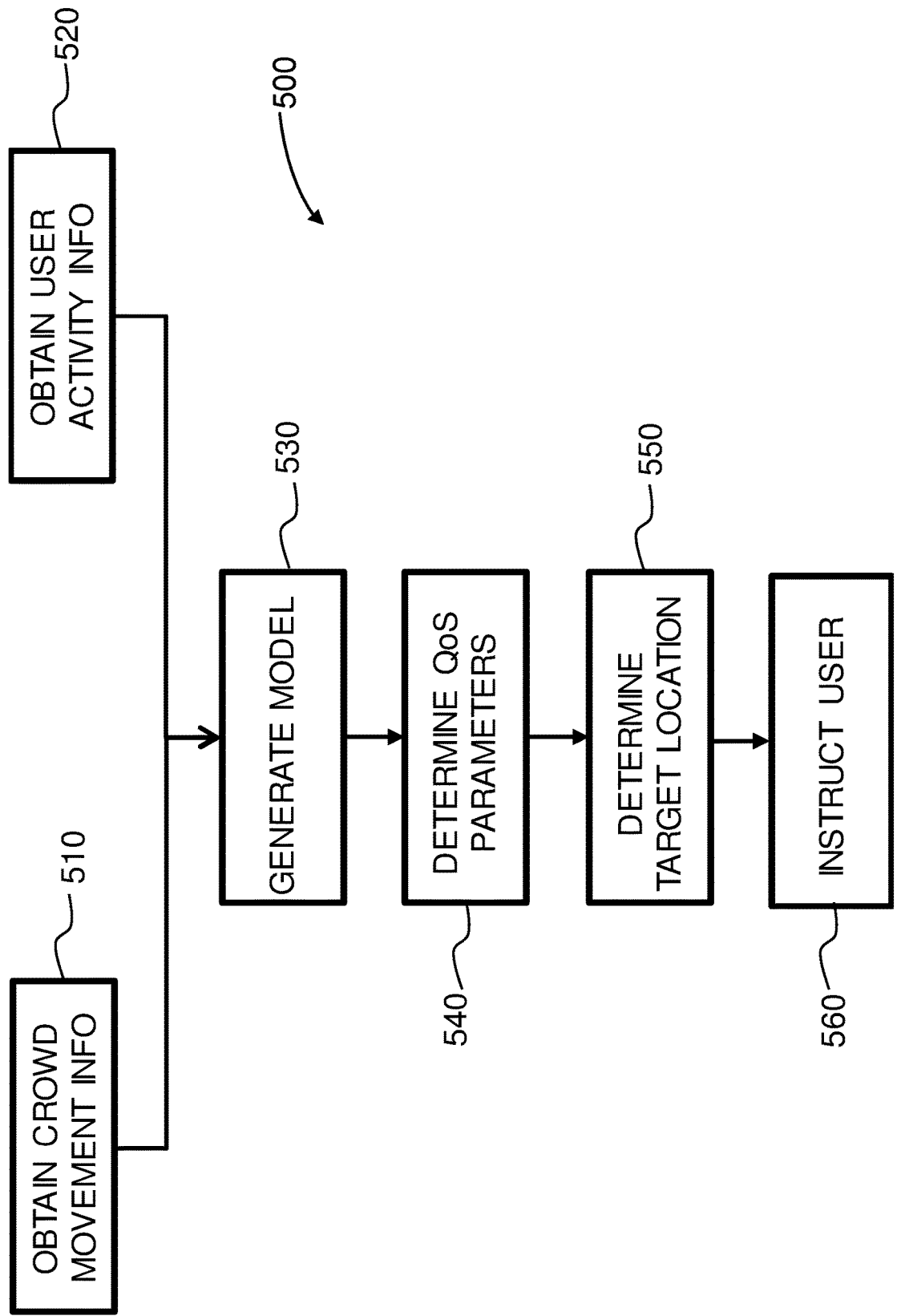

COMMUNICATION QUALITY MANAGEMENT

BACKGROUND

The present disclosure relates generally to the field of communication, and more particularly to managing the quality of a communication service.

Numerous communication technologies exist, and the development of each new generation of communication technology brings associated considerations and technical issues. Applications utilizing communication technologies also have associated requirements, and with each new generation of communication technology, these requirements may become more complex.

SUMMARY

The present disclosure seeks to provide a computer-implemented method, computer program product, and system for managing the quality of a communication service, which comprise obtaining crowd movement information relating to movement of individuals in a crowd within geographical spaces, and obtaining user activity information relating to one or more activities of interest to a user in a geographical space. A bandwidth density model is generated, based on the obtained crowd movement information and user activity information, the bandwidth model describing a variation of communication bandwidth density in the geographical space with respect to location and time. Quality of communication service parameters are determined, based on the bandwidth density model, with respect to location for the geographical space. Based on the quality of communication service parameters and a current location of the user in the geographical space, a target location in the geographical space is determined for the user. The user is instructed to move to the target location in the geographical space.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 5 is a flow diagram of a computer-implemented method for managing quality of communication service for a user in a geographical space according to an embodiment.

Figure 1:
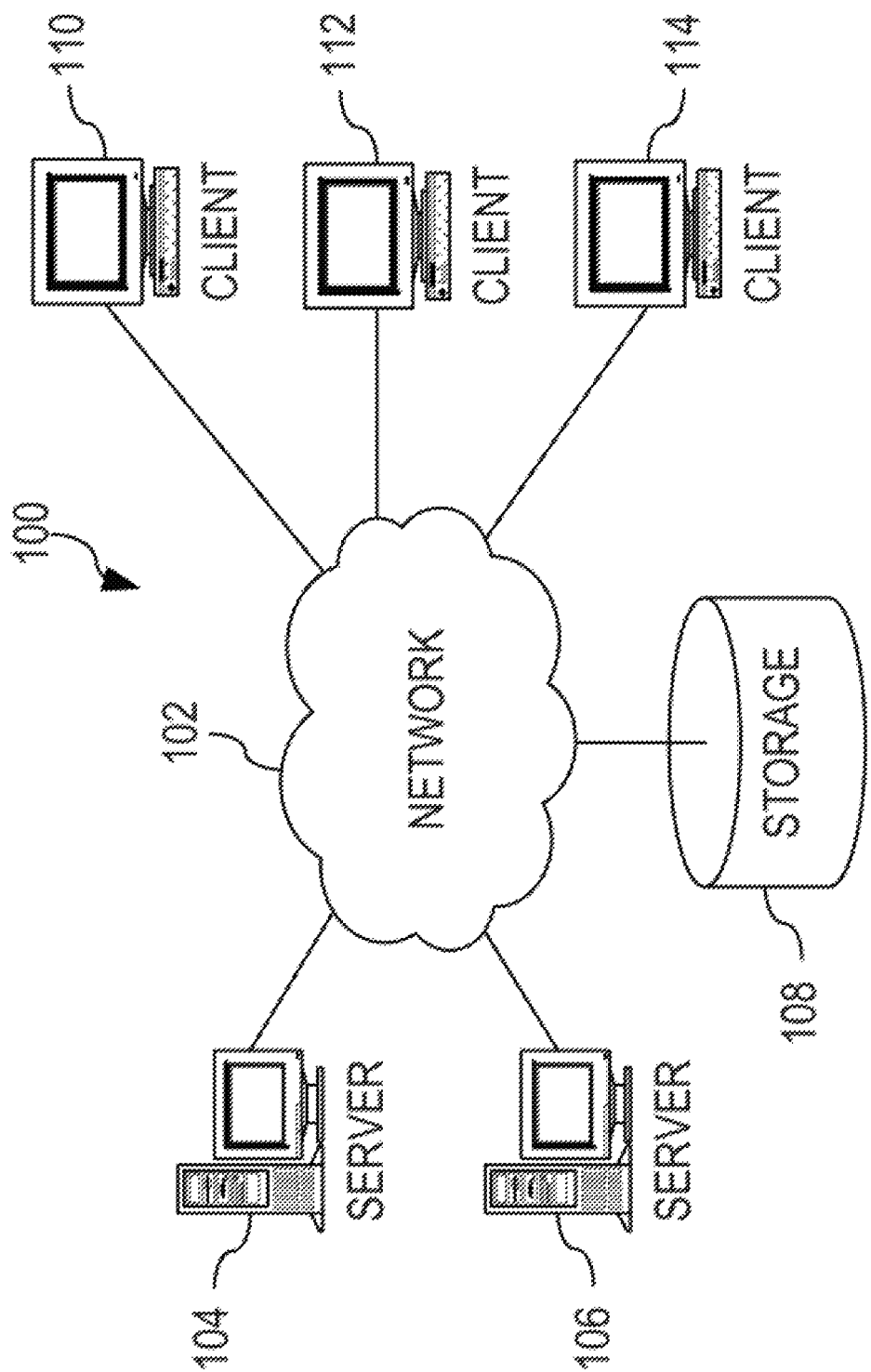
FIG. 1 depicts a pictorial representation of an example distributed system in which aspects of the illustrative embodiments may be implemented.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

It should be understood that the Figures are merely schematic and are not drawn to scale. It should also be understood that the same reference numerals are used throughout the Figures to indicate the same or similar parts.

In the context of the present application, where embodiments of the present disclosure constitute a method, it should be understood that such a method may be a process for execution by a computer, using a processor communicatively coupled with a memory. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present disclosure. For instance, a system may be a personal computer (PC), a server or a collection of PCs and/or servers connected via a network such as a local area network, the Internet and so on to cooperatively execute at least one embodiment of the methods of the present disclosure.

Proposed is a method, computer program product, and system for managing quality of communication service for a user in a geographical space. By modeling quality of communication service parameters (such as bandwidth, connection speed, data rate, contention ratio, etc.) with respect to location within a geographical space, the preferred geographic location of devices and users to ensure optimal quality of communication service may be determined. This may assist in instructing a user where to move within the geographic space so as to obtain a required or optimal quality of communication service.

A tool for enabling communication management systems to infer both bandwidth and crowd density within a geographical space, which can then be used to manage communication resources and/or device positioning, may therefore be provided by a proposed embodiment. This may facilitate assessment of communication bandwidth and crowd density for a geographical space over a temporal duration. For example, higher crowd density may be associated with reduced communication bandwidth, and thus poorer quality of communication service for users in the area of higher crowd density. Embodiments may therefore cater for communication service requirements for localized environment constraints and optimizers, which may change dynamically, with respect to time.

By way of example, proposed embodiments may generate a bandwidth density model, based on obtained crowd movement information and user activity information. The bandwidth model may describe a variation of communication bandwidth density in a geographical space with respect to location within the geographical space. It may also describe a variation of communication bandwidth density in the geographical space with respect to time. The generated bandwidth density model may then be used to determine quality of communication service parameters with respect to locations within the geographical space, and this information may in turned be used to instruct users (e.g., individuals with portable communication devices) to move to particular locations (e.g., away from a region of high crowd density and/or to a location with higher communication bandwidth) within the geographical space (so as provide an optimized geographic positioning of the users for optimized quality of communication service). In some embodiments, determined quality of communication service parameters may be used to determine how best to relocate users so to reduce crowd density in certain areas and/or minimize interference between users/devices within the geographical space.

Proposed embodiments may thus provide for suggesting localized physical movement of people/devices to facilitate optimized individual/group transmission and/or reception for a communication system. For example, if a first user (User A) is standing at location X with a device that is using frequencies with Y characteristics, it may cause problems with a proximate active wireless telecommunication link. An embodiment may, however, instruct User A to move to a different position to facilitate improved transmission/reception (e.g. "Joe, please move 3 meters to the left to facilitate b and c transmission" or "Kelley move 3 meters to the right closer to Liam for a stronger signal.")

Accordingly, proposed embodiments may provide a tool or method for assisting in the detection of what impact the movement of individuals within a geographic space may have with respect to the quality of a communication service. This may help to improve an understanding of how users/devices may be optimally arranged or positioned within the geographic space so as to ensure adequate or optimal quality of communication service.

Proposed embodiments may be configured to continuously track individual or crowd movement patterns and user activity, and store information linking movement patterns and/or user activities with bandwidth density in respect to location and time. Such information may then be used to identify how users/devices should be located within a geographic space to improve or optimize the quality of the communication service for one or more users/devices within the geographic space.

Reference to a geographical space is to be taken to refer to geographical area within which a user may move around. A geographical space may therefore be thought of as an area that, although it can be described using a single location identifier or label (e.g. town name, postal code/zip code, street, field, or other identifier), may include a plurality of locations or positions that may be defined or identified within the geographical space. Accordingly, a geographical space may be described or identified using a geofence. Also, a geographical space may be time dependent, time varying, and/or have an existence that is finite with respect to time. For example, a geographical space may be associated with (and even described with reference to) an event (such as a concert, sports game, festival, etc.).

Embodiments may, for example, enable a network cell management system to infer bandwidth and crowd density within an outdoor space. Further, assessment of quality communication service and crowd density over a temporal period may be enabled. Embodiments may therefore be particularly useful for large, temporary gatherings of individuals within a bounded area (such as an indoor or outdoor event with a large number of spectators). Crowd density/traffic patterns may be leveraged to account for movement of individual within a crowd during such an event, and a model of bandwidth density with respect to location and/or time may be derived. Using such a model, quality of communication service parameters within the bounded area may then be inferred. With such quality of communication service parameters identified, along with real-time information about an individual's position within the bounded area, suggestions as to where the individual may move for improved quality of communication service may be deployed.

Embodiments may be thought of as generating a model of how communication bandwidth relates to space/location and time for a geographic space occupied by a plurality of individuals with communication devices. This may be achieved by analyzing movement and activity patterns of individuals to infer or predict communication parameters and/or changes created by the individuals within the geographic space.

Embodiments may provide facilitate the efficient and effective provision of communication services within a geographic space. Such concepts may be based on modelling bandwidth variations for the geographic space in consideration of movement and activities of individuals within the geographic space.

By way of further example, embodiments may propose extensions to existing computer systems and/or communication systems. Such extensions may enable a communication system to provide additional service management functionality by leveraging the techniques of the current disclosure. In this way, a computer system or communication system may be improved by implementing or 'retrofitting' a proposed embodiment.

Illustrative embodiments may provide for analyzing and discovering links between position of an individual within a geographic space and quality of communication service, and such techniques may account for changes over time. Dynamic quality of communication service management techniques may therefore be provided by proposed embodiments.

Modifications and additional steps to a traditional communication management system may also be proposed which may enhance the value and utility of the proposed techniques.

In some embodiments, instructing the user to move to the target location in the geographical space may include incentivizing the user to move to the target location in the geographical space. In this way, the likelihood of the user adhering to the instruction may be increased, which may, in turn, make it more likely the quality of communication service requirements are met for all users. This may increase the effectiveness of instructions provided by embodiments.

In some embodiments, determining quality of service parameters may include processing the bandwidth density model in conjunction with a non-linear least squares method.

Generating a bandwidth density model may be further based on a model of pseudo random movement of a crowd over time. This may recognize that individuals and cohorts of users may move in a pseudo random way over time. Such migratory movement may, for example, be modeled using Brownian motion. Embodiments may therefore be adapted to account for random movements of individuals and/or crowds, thus potentially improving accuracy.

In embodiments, the communication may be via a wireless telecommunications link employing an $n^{th}$ generation of wireless mobile telecommunications technology and based on a set of standards that comply with international specifications, where n is a number greater than 1. For instance, n may be greater than or equal to 5. Embodiments may therefore be particularly useful for 5G communication networks (e.g., $5^{th}$ generation technologies) or subsequent generation communication networks. Such 5G (or higher) communication networks may be place high demands on available resources (e.g. bandwidth, network capacity, battery capacity, etc.). Embodiments may help to alleviate an impact of these demands, by facilitating optimized 5G transmission/reception for individuals though management of the locations/positions of the individuals within a geographical space. Implementation of 5G networks (and higher) may therefore be assisted by proposed embodiments. However, it will be appreciated that the communication may be via wired communication links, and proposed embodiments may thus facilitating optimized transmission/reception via wired communication links though management of the locations/positions of the wired devices (and thus there interconnections) in a geographical space.

FIG. 1 depicts a pictorial representation of an exemplary distributed system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present disclosure, and therefore, the particular elements shown in FIG. 1 should not be considered limiting with regard to the environments in which the illustrative embodiments of the present disclosure may be implemented.

Figure 2:
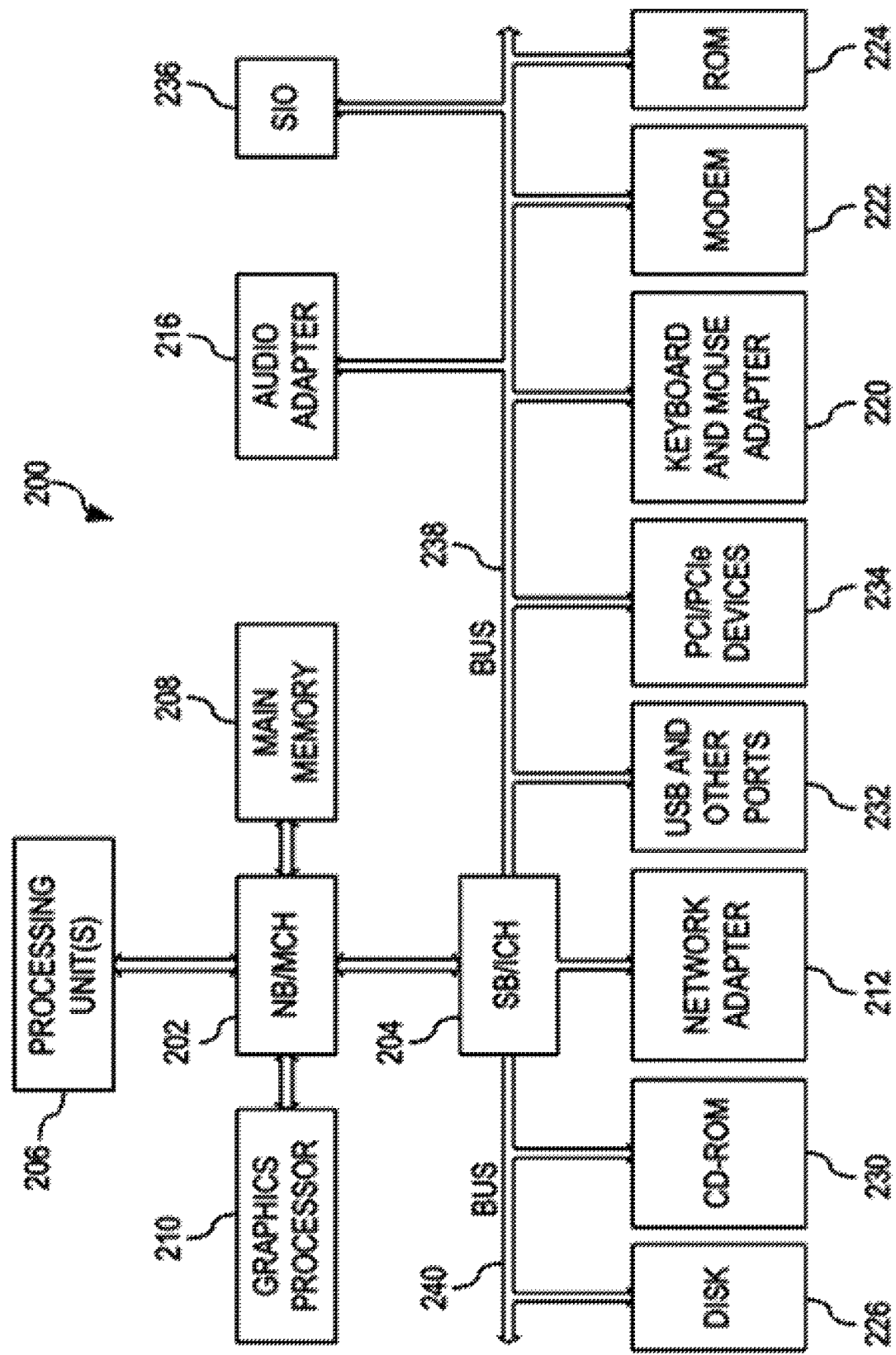
FIG. 2 is a block diagram of an example system in which aspects of the illustrative embodiments may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present disclosure may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the JAVA programming system, may run in conjunction with the operating system and provides calls to the operating system from Java™ programs or applications executing on system 200.

As a server, system 200 may be, for example, an IBM® eServer™ System P® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present disclosure may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present disclosure.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

A proposed concept may enhance a wireless mobile communication system by providing instructions for an individual to move to a target location within a geographical space. Embodiments may provide such instructions by employing a model describing a variation of communication bandwidth density in the geographical space with respect to location and time. Such a model may be generated in consideration of information relating to movement of individuals in a crowd within geographical spaces and information relating to one or more activities of interest to a user in the geographical space.

Figure 3:
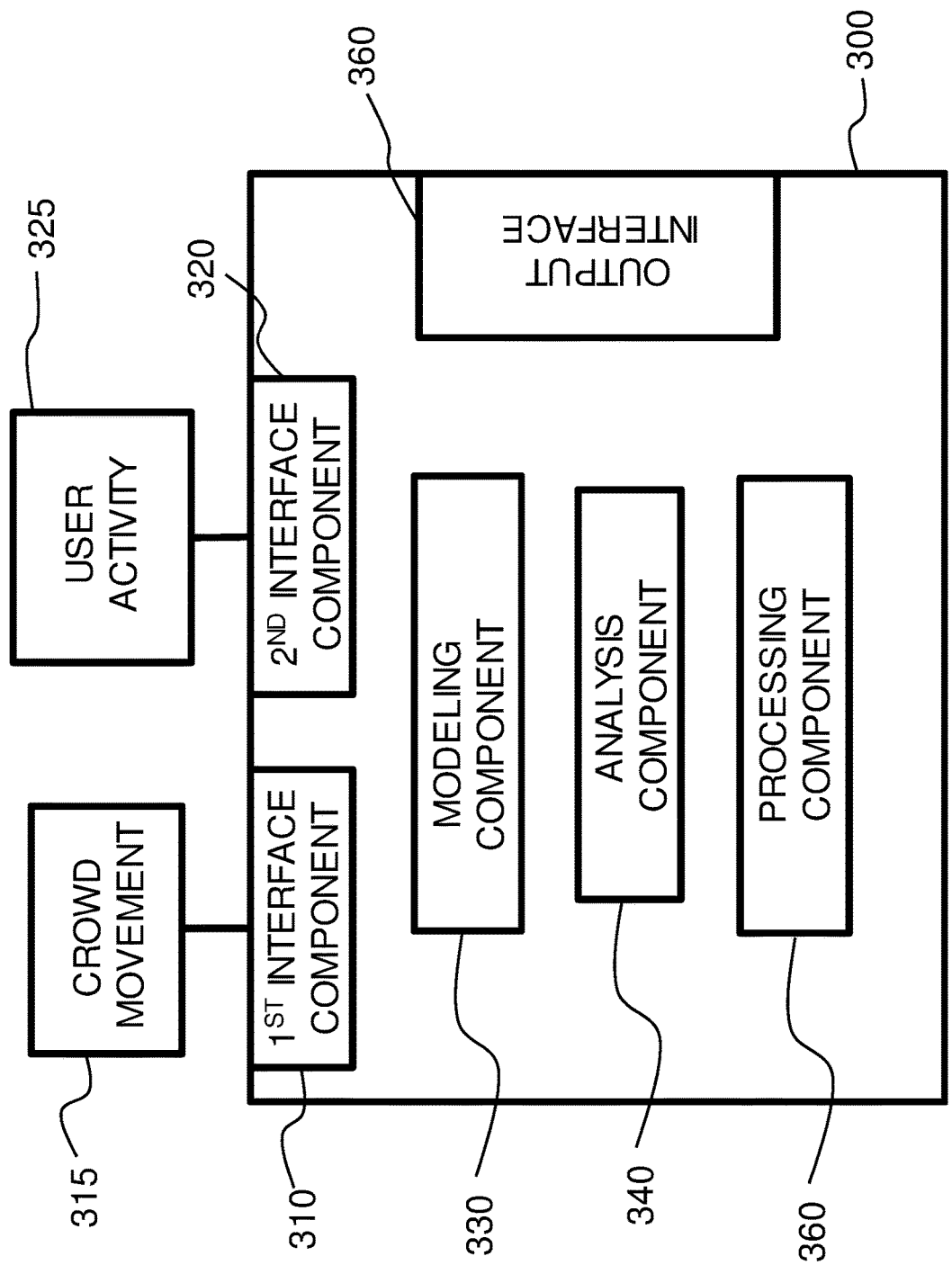
FIG. 3 is a simplified block diagram of an exemplary embodiment of a system for managing quality of communication service for a user in a geographical space according to an embodiment.

FIG. 3 is a simplified block diagram of an exemplary embodiment of a system 300 for managing quality of communication service for a user in a geographical space. Here, communication is via a wireless telecommunications link employing a 5th generation of wireless mobile telecommunications technology and based on a set of standards that comply with international specifications. Such communication may otherwise be referred to as employing "5G" technology (or a 5G network). Of course, other example may employ other (preceding or subsequent) generations of wireless mobile telecommunications technology.

The system 300 comprises a first interface component 310 configured to obtain crowd movement information relating to movement of individuals in a crowd within geographical spaces. In this example, the first interface component 310 is configured to analyze historical crowd information 315 relating to previous crowd density or traffic patterns in geographical spaces to determine crowd movement information. Such historical crowd information may, for example, be retrieved from a (local or remotely located) data storage unit (e.g., database).

The system 300 also includes a second interface component 320 configured to obtain user activity information relating to one or more activities of interest to a user in a geographical space. In this example, the second interface component 320 is configured to analyze historical user information 325 relating to previous activities of the user to determine user activity information relating to one or more activities of interest to a user in a geographical space. Again, such historical user information 325 may, for example, be retrieved from a (local or remotely located) data storage unit (e.g., database).

A modeling component 330 of the system 300 is configured to generate a bandwidth density model, based on the obtained crowd movement information and user activity information. The bandwidth model is adapted to describe a variation of communication bandwidth density in the geographical space with respect to location and time. Also, to make the bandwidth density model reflect real crowd movement more accurately, the modeling component 330 is configured to generate the bandwidth density model further based on a model of pseudo random movement of a crowd over time.

The system 300 also comprises an analysis component 340 that is configured to determine, based on the bandwidth density model, quality of communication service parameters with respect to location for the geographical space. Such quality of communication service parameters may, example, include a measure of bandwidth or connection speed (e.g., data transfer rate). Here, the analysis component 340 is configured to process the bandwidth density model in conjunction with a non-linear least squares method to determine the quality of communication service parameters. The non-linear least squares method can be used to infer optimal crowd density which may achieve a high degree of precision.

A processing component 360 of the system is configured to determine, based on the quality of communication service parameters and a current location of the user in the geographical space, a target location in the geographical space for the user. The target location may, for example, include one or more positions in the geographical space at which the quality of communication service parameters meet (or exceed) predetermined requirements (e.g. minimum acceptable bandwidth or connection speed (e.g., data transfer rate)). By way of example, the predetermined requirements may be based on general service guidelines and/or individual requirements associated with the user (e.g., according to: user inputs, an importance level of the user, a subscription/membership plan associated with the user, and/or an account status of the user).

An output interface 360 of the system is configured to instruct the user to move to the target location in the geographical space. For instance, the output interface is configured to communicate instructions to the user advising him/her of the relative position of the target location with respect to his/her current location in the geographical space. To increase a likelihood that the user moves to the target location, the output interface 360 also communicates an incentive to the user which is designed to incentivize the user to move to the target location in the geographical space (e.g., by detailing the improvements in communication service obtainable at the target location). In this way, improved control and management of communication service throughout the geographical space may be obtained (e.g., by influencing the position of users/devices across the geographical space).

Thus, considering an exemplary use case of a large temporal gathering of individuals at an outdoor location, it will be appreciated that the system 300 of FIG. 3 may provide for the optimized geographic location of devices and/or users to ensure maximal quality of communication service.

Techniques employed by such an embodiment include:
mining and analysis of social user information to understand the types of activity a user engages in when within a certain geographical space (e.g., at an outdoor event);
mining an analysis of crowd density/traffic patterns to understand the movement of individuals within a crowd;
deriving (and/or maintaining) a social bandwidth density model (SBDM) based on the analysis results; and
using the SBDM to infer quality of communication service parameters within a geo-spatial boundary.

With the quality of communication service parameters known, along with real-time information, suggested movement notifications can be deployed to individuals/groups.

Also, reward schemes may be implemented (above and beyond the notification of target location(s) to the involved users).

Exemplary implementation for an outdoor event:

Step 1: social user information & data is mined to understand the types of activity a user engages in at an outdoor event. For this, a social media footprint of each individual may be analyzed to understand the types of communication services a user consumes over time. A simplified table below shows the usage of four example users:

TABLE 1

| User | Service | Temporal Usage (mins) | Bandwidth Used |
| --- | --- | --- | --- |
| John | Video Streaming | 24 | 156 mb |
| Paul | Social Messaging | 45 | 34 mb |
| George | Picture uploads | 18 | 30 mb |
| Ringo | Social messaging | 36 | 28 mb |

Figure 4A:
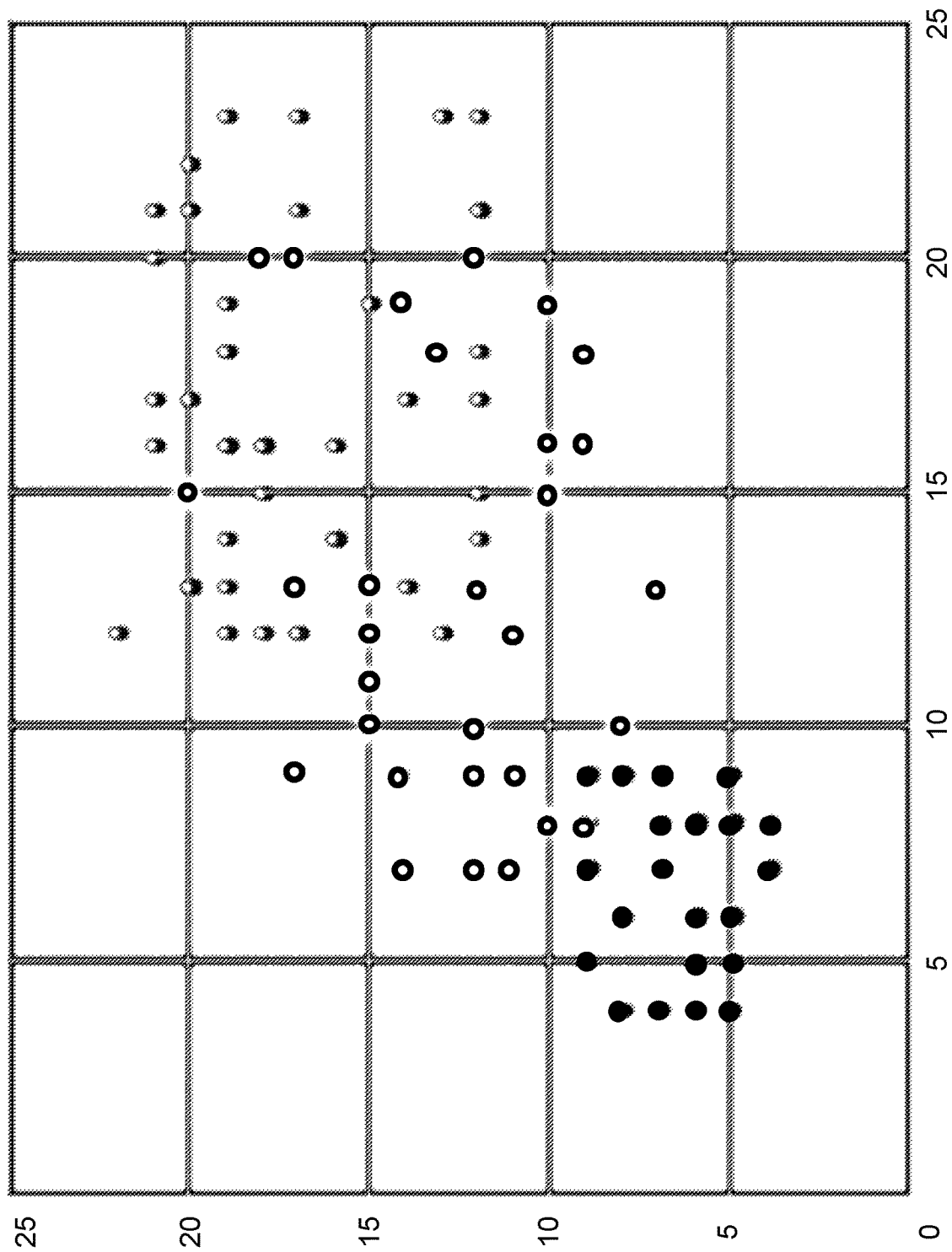
FIGS. 4A-4D are temporal plots illustrating an exemplary implementation of an embodiment.

Step 2: Crowd density/traffic patterns are analyzed to obtain information regarding the movement of individuals within a crowd during outdoor events. An exemplary temporal plot of such information is shown in FIG. 4A. In this example, groups are clustered by their bandwidth usage along an X/Y positioning system. Group 1 is depicted using black-filled circles "•" and includes users with bandwidth usage in excess of 100 mb (e.g., John in Table 1). Group 2 is depicted using white-filled circles "o" and includes users with bandwidth usage in less than or equal to 30 mb (e.g., Ringo and George in Table 1). Group 3 is depicted using white-filled circles having a shadow "⊙" and includes users with bandwidth usage in excess of 30 mb but less than or equal to 100 mb (e.g., Paul in Table 1).

Figure 4B:
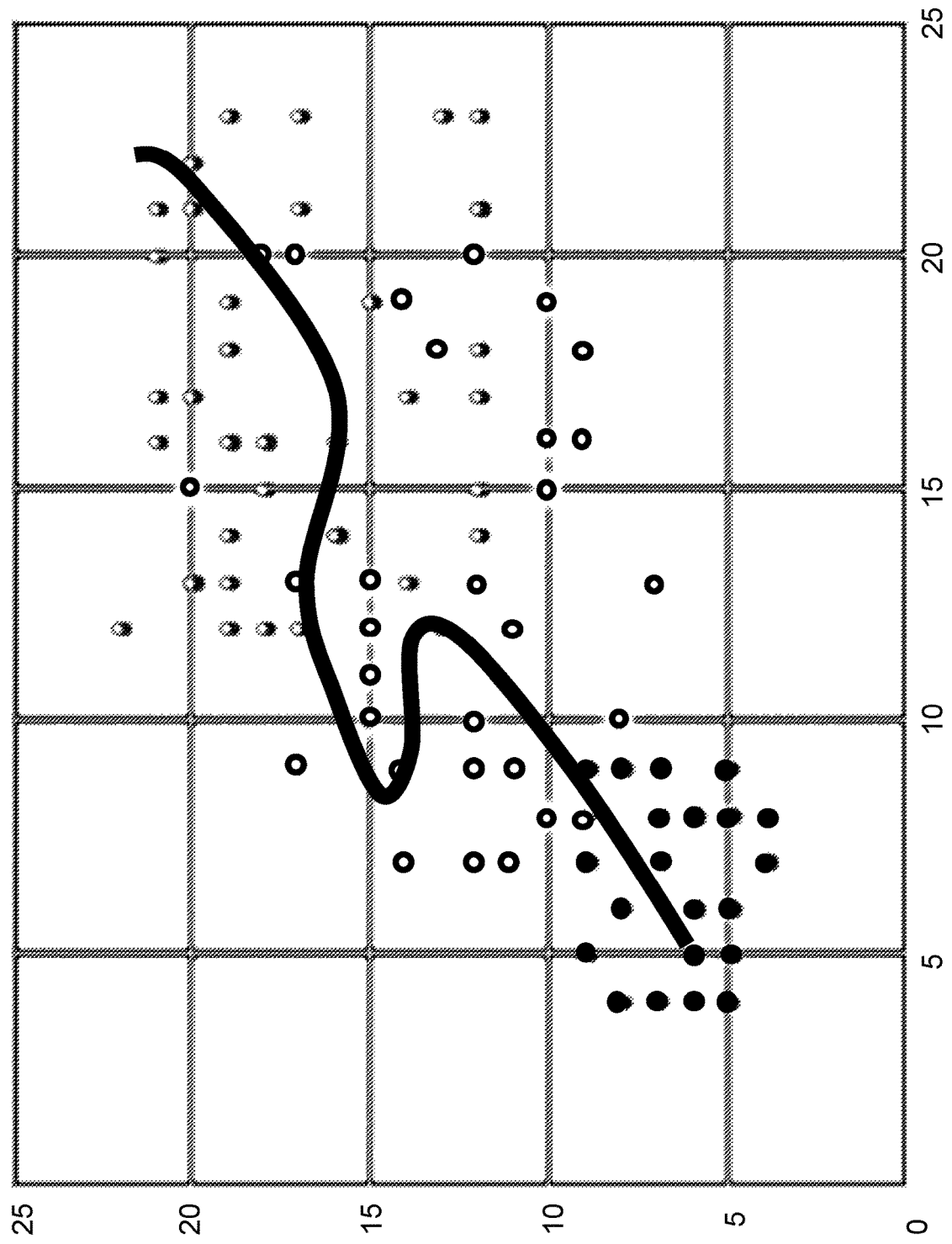

Step 2.1: It is proposed that individuals and groups of users will move in a pseudo random way over time. This migratory movement can be modeled using Brownian motion. An example of such user movement over time is depicted in FIG. 4B using a thick black line.

Figure 4C:
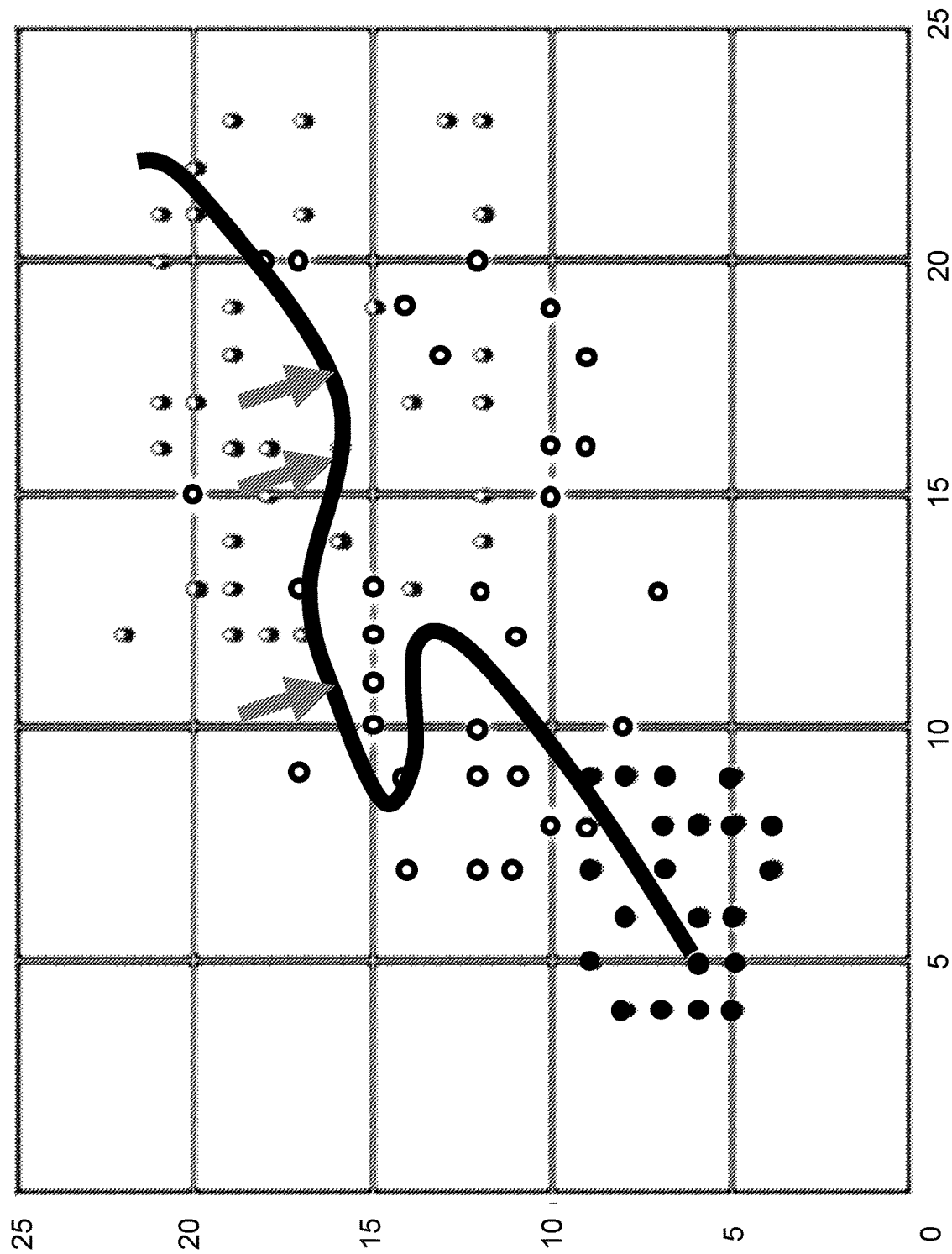

Step 3: Using the movement information combined with bandwidth usage, a social bandwidth density model (SBDM) is derived. Using the model, it can be determined that members of Group 3 (such as Paul) will likely experience 5G transmission problems in the locations identified using arrows in FIG. 4C (e.g., because these locations lie on the migratory movement path and will thus experience a high crowd density). If the studied group (e.g., Group 3) has a strong affinity for using 5G (rather than dynamic downgrading to a previous generation of communication technology, e.g. 4G/3G), then that group will perceive reduced quality of communication service.

Figure 4D:
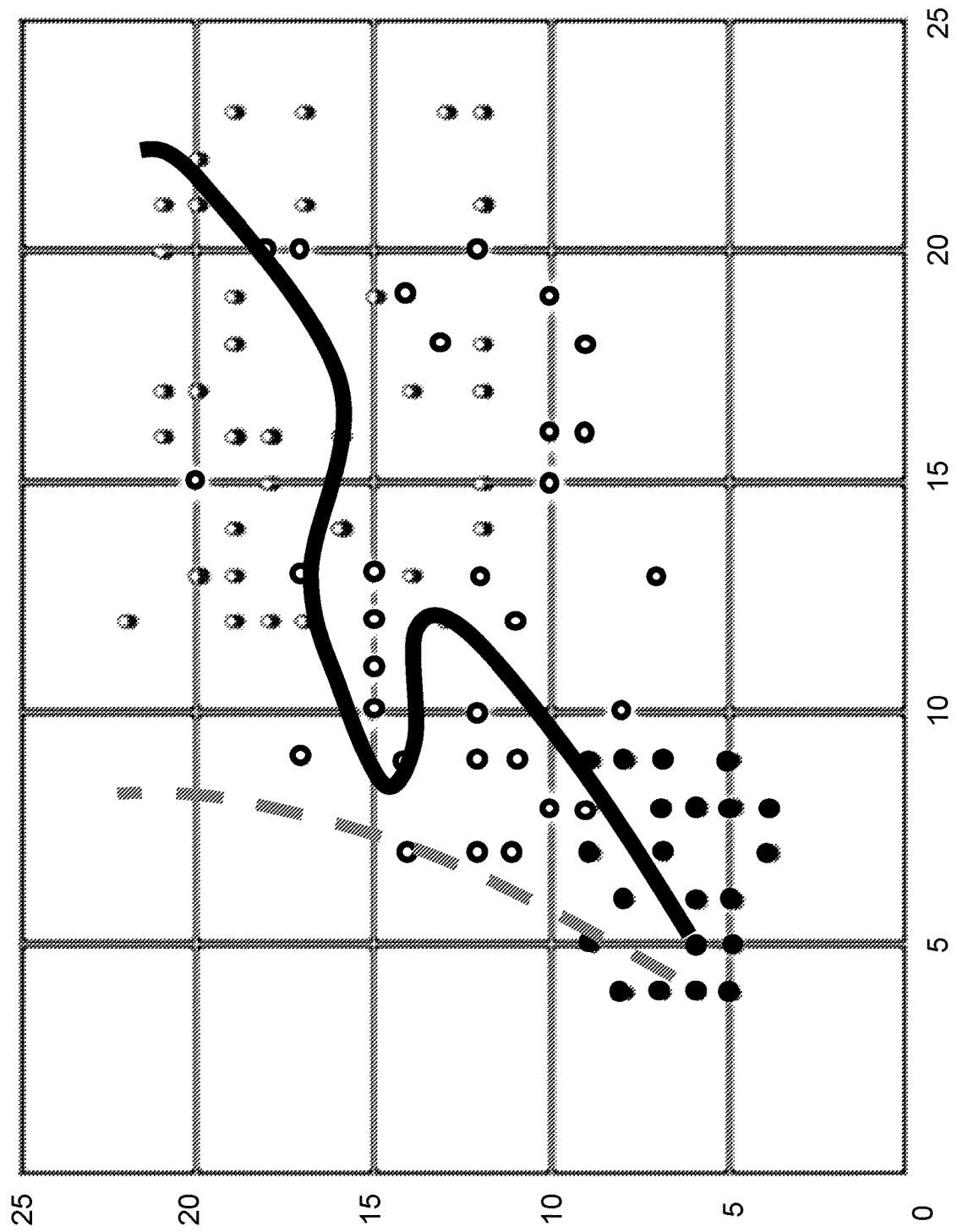

Step 4: The SBDM model is then used to infer mobility parameters within a geo-spatial boundary. FIG. 4D shows a fitted dashed curve that is computed at regular intervals to allow for temporal movement and bandwidth changes to illustrate the requirement for device mobility to allow for optimal transmission between individuals/cohorts and cell station. This dashed curve is representative of suggested navigation for the studied group (e.g., Group 3) away from the modeled migratory movement path and other groups. Further, reward schemes, when acting as a group, can be gamified such that there are intra-group efficiencies, (e.g., proximate groups may be load balanced over time to maintain an overall (normalized) level of communication service or performance.

It is to be understood that the exemplary implementation detailed above is just one of many possible implementations that may be employed to manage quality of communication service for one or more users in a geographical space. Accordingly, there are many other potential implementations that could also be used.

Referring now to FIG. 5, depicted is a flow diagram of a computer-implemented method 500 for managing the quality of a communication service for a user in a geographical space according to an embodiment. In this example, an $n^{th}$ generation of telecommunications technology is employed, where n is a number greater than 1.

Step 510 of the method includes obtaining crowd movement information relating to movement of individuals in a crowd within geographical spaces. Here, step 510 may further include analyzing historical crowd information relating to previous crowd density or traffic patterns in the same, or substantially similar, geographical spaces to determine crowd movement information. By way of example, the historical user information relates to previous activities of the user(s) in a geographical space and/or includes historical social media information relating to previous activities of the user on one or more social media platforms.

Step 520 of the method comprises obtaining user activity information relating to one or more activities of interest to a user in a geographical space. More specifically, step 520 of obtaining user activity information relating to one or more activities of interest to a user in a geographical space may include analyzing historical user information relating to previous activities of the user to determine user activity information relating to one or more activities of interest to a user in a geographical space.

In step 530, a bandwidth density model is generated based on the obtained crowd movement information and user activity information. The bandwidth model describes a variation of communication bandwidth density in the geographical space with respect to location and time, where communication bandwidth density includes a measure of bandwidth of the wireless telecommunications link.

Next, step 540 of the method includes determining, based on the bandwidth density model, quality of communication service parameters with respect to location for the geographical space. In this example, determining quality of service parameters includes processing the bandwidth density model in conjunction with a non-linear least squares method.

Based on the quality of communication service parameters and a current location of the user in the geographical space, a target location in the geographical space is determined in step 550. In embodiments, a target location may represent the projected location, according to the modeling, where the user may experience the strongest signal, and therefore the best quality of the communication service. In embodiments, the target location may represent a target location that would provide the strongest overall signal for a group of users, and not necessarily to the user, in particular. For example, while a single user may experience the best signal at the top of a hill, if 50 users congregate at the apex of the hill, the overall signal among all 50 users may experience bandwidth congestion, thereby decreasing the quality of the communication service. To remedy such a situation, each user of the 50 users may be directed to separate target locations staggered about the hill, such that the quality of the communication service among all users is maintained at, or close to, an optimized average quality of the communication service among all 50 users.

Finally, in step 560, the user is instructed to move to the target location in the geographical space (e.g., via communication of an audio/visual instruction). In embodiments, the user may be provided a map indicating both the user's current location and the target location, and the map may further provide real-time updating of the user's location on the map as he/she moves about the area represented by the provided map. In another embodiment, incentives (e.g., advertisements, coupons, etc.) may further be displayed in conjunction with the provided map.

Figure 6:
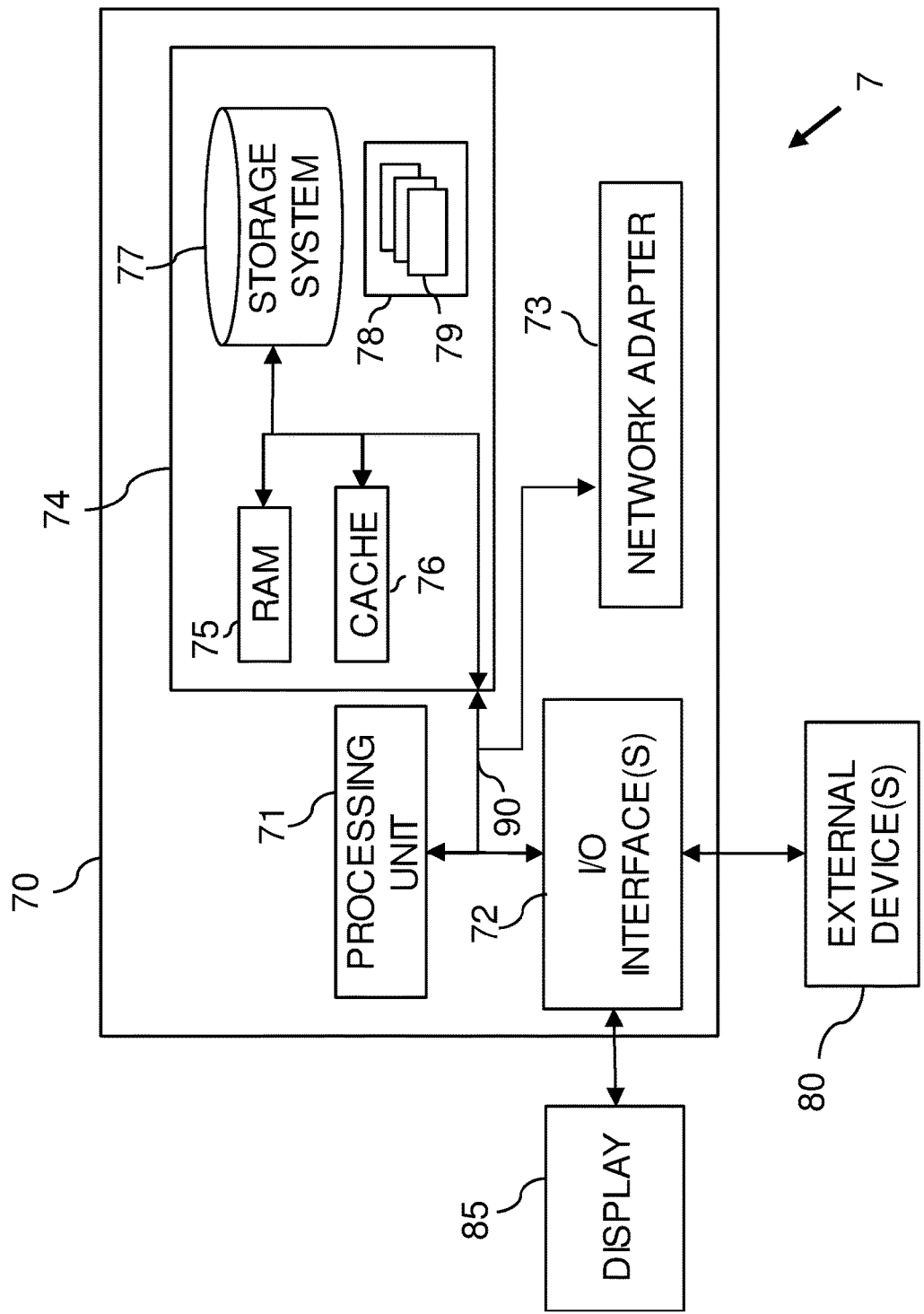
FIG. 6 illustrates a system according to another embodiment.

By way of further example, as illustrated in FIG. 6, embodiments may comprise a computer system 70, which may form part of a networked system 7. The components of computer system/server 70 may include, but are not limited to, one or more processing arrangements, for example comprising processors or processing units 71, a system memory 74, and a bus 90 that couples various system components including system memory 74 to processing unit 71.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 70 typically includes a variety of computer system readable media. Such media may be any available media that is accessible by computer system/server 70, and it includes both volatile and non-volatile media, removable and non-removable media.

System memory 74 can include computer system readable media in the form of volatile memory, such as random access memory (RAM) 75 and/or cache memory 76. Computer system/server 70 may further include other removable/non-removable, volatile/non-volatile computer system storage media. By way of example only, storage system 74 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 may include at least one program product having a set (e.g., at least one) of program modules that are configured to carry out the functions of embodiments of the disclosure.

Program/utility 78, having a set (at least one) of program modules 79, may be stored in memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out the functions and/or methodologies of embodiments of the disclosure as described herein.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73. As depicted, network adapter 73 communicates with the other components of computer system/server 70 via bus 90. It should be understood that although not shown, other hardware and/or software components could be used in conjunction with computer system/server 70. Examples, include, but are not limited to: microcode, device drivers, redundant processing units, external disk drive arrays, RAID systems, tape drives, and data archival storage systems, etc.

In the context of the present application, where embodiments of the present disclosure constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for managing quality of a communication service for a user in a geographical space, the method comprising:
   obtaining a set of crowd movement information relating to the movement of individuals in a crowd within the geographical space;
   obtaining a set of user activity information relating to one or more activities of interest to the user in the geographical space, the one or more activities including video streaming, social messaging, and picture uploads;
   generating a bandwidth density model based on the obtained set of crowd movement information and the set of user activity information, the bandwidth model describing a variation of communication bandwidth density in the geographical space with respect to location and time;
   determining, based on the bandwidth density model, quality of communication service parameters with respect to location for the geographical space, wherein quality of communication service parameters include bandwidth, connection speed, data rate, and contention ratio;
   predicting, based on the bandwidth density model and the quality of communication service parameters, the user will perceive reduced quality of communication service at a current location of the user in the geographical space;
   based on the quality of communication service parameters and the current location of the user in the geographical space, determining a target location in the geographical space for the user; and
   instructing the user to move to the target location in the geographical space.

2. The method of claim 1, wherein instructing the user to move to the target location in the geographical space further comprises incentivizing the user to move to the target location in the geographical space, wherein the incentivizing includes providing advertisements and coupons.

3. The method of claim 1, wherein determining quality of service parameters further comprises processing the bandwidth density model in conjunction with a non-linear least squares method.

4. The method of claim 1, wherein generating the bandwidth density model is further based on a model of pseudo random movement of the crowd over time, wherein the model employs Brownian motion principles.

5. The method of claim 1, wherein obtaining crowd movement information further comprises analyzing historical crowd information relating to previous crowd density or traffic patterns in the geographical space to predict crowd movement information within the geographical space.

6. The method of claim 1, wherein obtaining user activity information further comprises analyzing historical user information relating to previous activities of the user to predict user activity information relating to the user in the geographical space.

7. The method of claim 6, wherein the historical user information relates to previous activities of the user in a substantially similar, but not the same, geographical space.

8. The method of claim 6, wherein the historical user information comprises historical social media information relating to previous activities of the user on one or more social media platforms.

9. The method of claim 1, wherein the communication service is employed via a wireless telecommunications link employing an $n^{th}$ generation of wireless mobile telecommunications technology, based on a set of standards that comply with international specifications, and wherein n is a number greater than 1.

10. The method of claim 9, wherein n is at least 5.

11. The method of claim 9, wherein the communication bandwidth density comprises a measure of bandwidth of the wireless telecommunications link.

12. A system for managing quality of a communication service for a user in a geographical space, the system comprising:
a memory with program instructions stored thereon; and
a processor in communication with the memory, wherein the system is configured to execute a set of actions, comprising:
obtaining a set of crowd movement information relating to the movement of individuals in a crowd within the geographical space;
obtaining a set of user activity information relating to one or more activities of interest to the user in the geographical space, the one or more activities including video streaming, social messaging, and picture uploads;
generating a bandwidth density model based on the obtained set of crowd movement information and the set of user activity information, the bandwidth model describing a variation of communication bandwidth density in the geographical space with respect to location and time;
determining, based on the bandwidth density model, quality of communication service parameters with respect to location for the geographical space, wherein quality of communication service parameters include bandwidth, connection speed, data rate, and contention ratio;
predicting, based on the bandwidth density model and the quality of communication service parameters, the user will perceive reduced quality of communication service at a current location of the user in the geographical space;
based on the quality of communication service parameters and the current location of the user in the geographical space, determining a target location in the geographical space for the user; and
instructing the user to move to the target location in the geographical space.

13. The system of claim 12, wherein instructing the user to move to the target location in the geographical space further comprises incentivizing the user to move to the target location in the geographical space, wherein the incentivizing includes providing advertisements and coupons.

14. The system of claim 12, wherein determining quality of service parameters further comprises processing the bandwidth density model in conjunction with a non-linear least squares method.

15. The system of claim 12, wherein generating the bandwidth density model is further based on a model of pseudo random movement of the crowd over time, wherein the model employs Brownian motion principles.

16. The system of claim 12, wherein obtaining crowd movement information further comprises analyzing historical crowd information relating to previous crowd density or traffic patterns in the geographical space to predict crowd movement information within the geographical space.

17. A computer program product for managing quality of a communication service for a user in a geographical space, the computer program product comprising a computer readable storage medium having program instructions embodied therewith, the program instructions executable by a device to cause the device to execute a set of actions, comprising:
obtaining a set of crowd movement information relating to the movement of individuals in a crowd within the geographical space;
obtaining a set of user activity information relating to one or more activities of interest to the user in the geographical space, the one or more activities including video streaming, social messaging, and picture uploads;
generating a bandwidth density model based on the obtained set of crowd movement information and the set of user activity information, the bandwidth model describing a variation of communication bandwidth density in the geographical space with respect to location and time;
determining, based on the bandwidth density model, quality of communication service parameters with respect to location for the geographical space, wherein quality of communication service parameters include bandwidth, connection speed, data rate, and contention ratio;
predicting, based on the bandwidth density model and the quality of communication service parameters, the user will perceive reduced quality of communication service at a current location of the user in the geographical space;
based on the quality of communication service parameters and the current location of the user in the geographical space, determining a target location in the geographical space for the user; and
instructing the user to move to the target location in the geographical space.

18. The computer program product of claim 17, wherein instructing the user to move to the target location in the geographical space further comprises incentivizing the user to move to the target location in the geographical space, wherein the incentivizing includes providing advertisements and coupons.

19. The computer program product of claim 17, wherein determining quality of service parameters further comprises processing the bandwidth density model in conjunction with a non-linear least squares method.

20. The computer program product of claim 17, wherein generating the bandwidth density model is further based on a model of pseudo random movement of the crowd over time, wherein the model employs Brownian motion principles.

* * * * *